United States Patent Office 3,136,771
Patented June 9, 1964

3,136,771
BIS-(2-BENZOXAZOLYL)FURYLMETHY-
PYRIDINIUM CHLORIDE
Peter Liechti, Binningen, Erwin Maeder, Munchenstein, and Adolf Emil Siegrist, Basel, Switzerland, assignors to Ciba Limited, Basel, Switzerland, a company of Switzerland
No Drawing. Filed Jan. 24, 1963, Ser. No. 253,752
Claims priority, application Switzerland Mar. 9, 1962
1 Claim. (Cl. 260—296)

The present invention provides valuable new pyridinium chloride compounds of the formula (1)

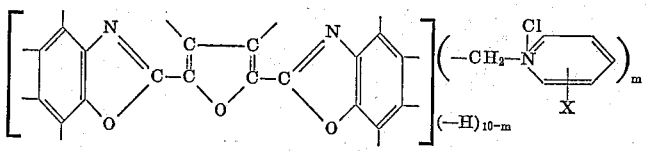

or of the formula (1a)

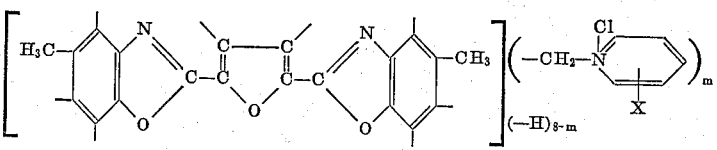

in which X is hydrogen or methyl and $m=1$ or 2.

These new pyridinium chloride compounds are obtained when a chloromethyl compound of the formula (2)

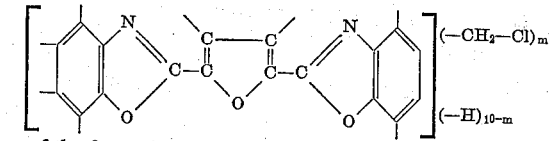

or of the formula (2a)

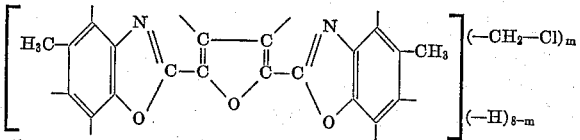

(in which $m=1$ or 2) is reacted in known manner with a pyridine compound of the formula (3)

in which X stands for hydrogen or methyl, i.e. with pyridine itself or a picoline (2-, 3- or 4-methylpyridine).

The chloromethyl compounds of the Formulae 2 and 2a, to be used as further starting material, are new; they are likewise accessible by known methods, for example by introducing 1 to 2 chloromethyl groups into 2:5-di-[benzoxazolyl-(2')]-furan compounds of the formula (4)

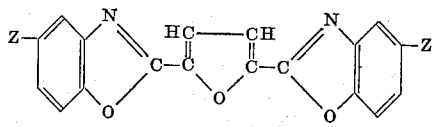

in which Z stands for a hydrogen atom or a methyl group—by reaction with hydrogen chloride and formaldehyde or paraformaldehyde or with dichloromethyl ether in the presence of chlorosulfonic acid and possibly of sulfuric acid. The chloromethylation is advantageously performed at a temperature below 100° C., for example at 60 to about 80° C. If desired, metals or metal salts, for example zinc chloride, may further be added.

The 2:5-di-[benzoxazolyl-(2')]-furan compounds of the Formula 4 can be prepared by known methods, for example by reacting furan-2:5-dicarboxylic acid or a functional derivative thereof at an elevated temperature ranging from 160 to 260° C., more especially from 180 to 220° C., and preferably in the presence of a catalyst such as boric acid, in the molecular ratio of 1:2 with 1-amino-2-hydroxy-5-methyl-benzene.

The new onium compounds of the Formula 1 and of the Formula 1a obtained by the present process are valuable optical brighteners for fibrous organic materials. As examples of fibrous materials suitable for brightening there may be mentioned those from cotton, viscoses, acetate rayon, polyvinyl chloride, polyethylene, polypropylene or polyamides. The new onium compounds are especially valuable optical brighteners for fibrous materials from polyacrylonitrile and acrylonitrile copolymers.

These fibrous materials are optically brightened by treatment with aqueous solutions of the selected onium compounds. If desired, the treatment may be performed in the presence of a dispersant. It has been found particularly advantageous to use neutral, weakly alkaline or acidic liquors. It is also of advantage to perform the said treatment at an elevated temperature ranging from about 50 to 100° C.

The new onium compounds may also be added to bleaching baths, for example chlorite bleaching baths; this leads to particularly strong brightening effects.

The amount of new onium compound to be used according to the present invention, calculated from the weight of the fibrous material to be optically brightened, may vary within rather wide limits. Even a small amount thereof, in certain cases, for example, as little as about 0.01%, will produce a distinct and lasting brightening effect, though it is equally possible to use up to about 3% of the brightener.

The present invention further provides stable preparations for optically brightening fibrous organic materials, more especially fibrous materials from polyacrylonitrile or acrylonitrile copolymers. These stable preparations contain onium compounds of the composition defined above and, for example, a dispersant, a water-soluble inorganic salt or a dressing agent.

Unless otherwise indicated, parts and percentages in the following examples are by weight.

*Example 1*

23.0 parts of dichloromethyl ether are stirred at 70° C. within 15 minutes into a solution of 16.5 parts of 2:5-di-[5'-methylbenzoxazolyl-(2')]-furan in 50 parts by volume of chlorosulfonic acid, and the mixture stirred for 15 minutes longer at 70° C. The solution is cooled to 0° C. and added dropwise with vigorous stirring into 300 parts of ice; the pale-yellow precipitate is suctioned off, washed with water until the washings run neutral to Congo red and then dried under vacuum at 40° C., to yield about 26.2 parts of crude chloromethyl compound in the form of a light-yellow powder melting at 210 to 217° C.

A mixture of 4.5 parts of the resulting chloromethyl compound and 10 parts by volume of pyridine is refluxed for 5 minutes; at the start the product dissolves but it soon settles out again as a yellow, resinous substance. The reaction mixture gives in 100 parts of water a clear solution which is treated with 2 parts of active carbon, filtered and evaporated under vacuum to dryness, to yield about 5.6 parts of the pyridinium chloride in the form of a brownish yellow amorphous substance which is readily soluble in water and can be used as optical brightener for polyacrylonitrile fibers.

When the chloromethyl compound is reacted, instead of with 10 parts by volume of pyridine, in identical manner with the equivalent amount of 2-methylpyridine, 3-methylpyridine or 4-methylpyridine, there is obtained an approximately equal yield of the corresponding water-soluble picolinium chloride in the form of a brownish yellow, amorphous substance which is likewise suitable as optical brightener for polyacrylonitrile fibers.

The 2:5-di-[5'-methylbenzoxazolyl-(2')]-furan, used as starting material in the above example, may be prepared thus:

A mixture of 125 parts of furan-2:5-dicarboxylic acid, 205 parts of 1-amino-2-hydroxy-5-methylbenzene, 8 parts of boric acid and 800 parts by volume of diethyleneglycol diethyl ether is heated within 90 minutes to 190° C. and then stirred at 190 to 195° C., during which the diethyleneglycol diethyl ether and the water of reaction formed are distilled off. This distillation takes a total of 5 hours. The batch is stirred for 4 hours at 190 to 195° C., then cooled to 150° C., 500 parts by volume of dimethylformamide are added and the whole is allowed to cool to room temperature. The crystals formed are suctioned off, washed with methanol and dried, to yield 238 parts (=72% of the theoretical yield) of 2:5-di-[5'-methylbenzoxazolyl-(2')]-furan in the form of a light-brown powder which melts at 209 to 211° C. On recrystallization from dimethylformamide with the aid of active carbon, there are obtained 195 parts of substantially colorless 2:5-di-[5'-methylbenzoxazolyl-(2')]-furan melting at 211 to 212° C.

*Example 2*

A polyacrylonitrile fabric (for example Orlon) is treated at a goods-to-liquor ratio of 1:40 with 0.1 to 0.5% of the pyridinium chloride or of a picolinium chloride (prepared as described in Example 1) for 60 minutes at about 60 to 100° C. in a bath containing per liter 1 g. of formic acid of 85% strength, 2 g. of an adduct from about 35 mols of ethylene oxide with 1 mol of octadecyl alcohol, and 1 g. of sodium chlorite. The fabric is then rinsed and dried. The fabric treated in this manner has a substantially higher white content than a comparable fibrous material treated in the absence of the onium compound.

What is claimed is:

A pyridinium-chloride compound of the formula

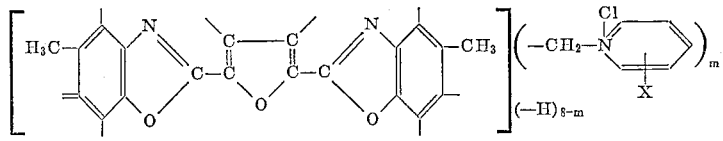

wherein X is selected from hydrogen and methyl and $m$ is a positive integer less than 3.

References Cited in the file of this patent

UNITED STATES PATENTS

| | | |
|---|---|---|
| 2,807,619 | Cislak | Sept. 24, 1957 |
| 2,833,779 | Fields et al. | May 6, 1958 |
| 2,886,572 | Engelhardt | May 12, 1959 |
| 2,985,661 | Hein et al. | May 23, 1961 |
| 2,995,564 | Duennenberger et al. | Aug. 8, 1961 |